Dec. 17, 1940.  A. A. KOTTMANN  2,225,600

APPARATUS FOR SLICING BREAD

Filed May 9, 1939  2 Sheets-Sheet 1

INVENTOR
ARTHUR A. KOTTMANN
BY
ATTORNEYS

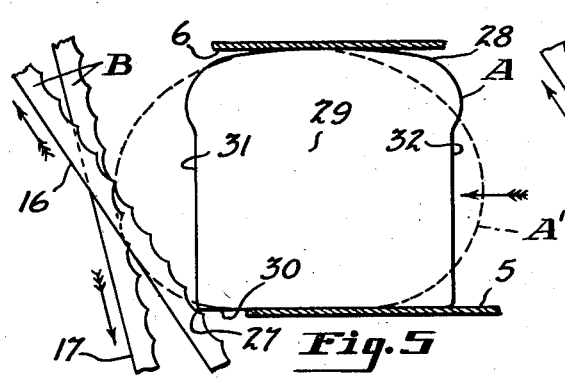
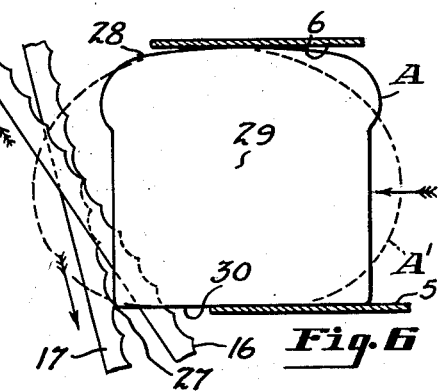
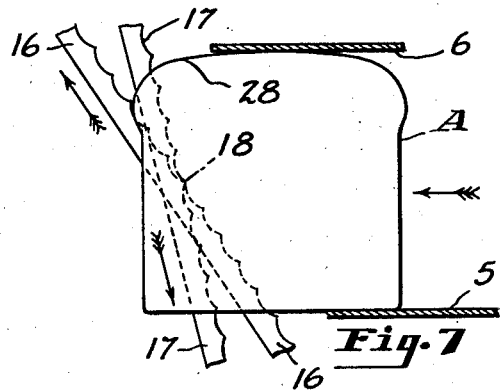
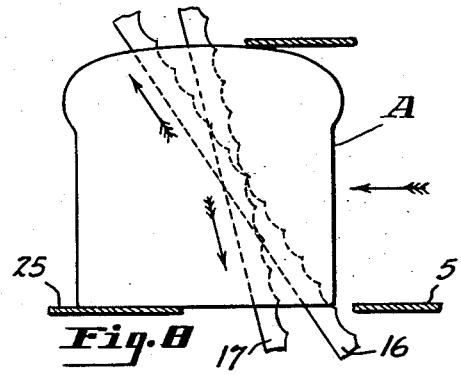
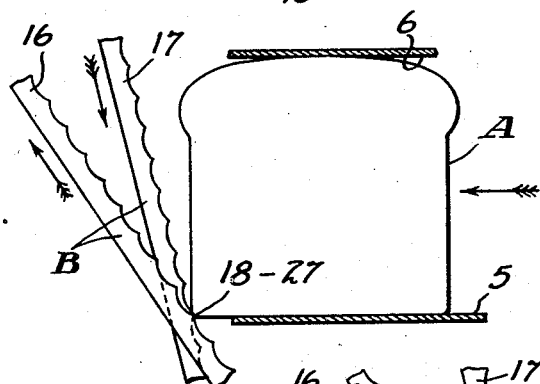
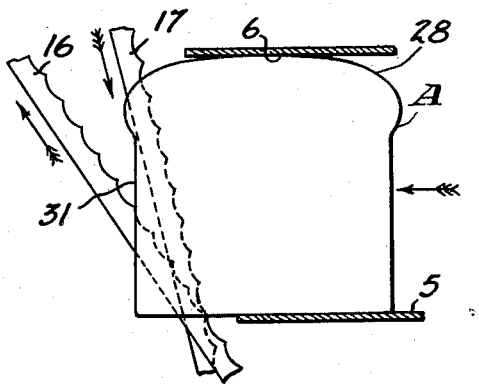
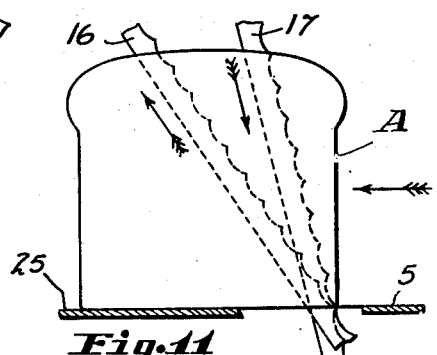

Patented Dec. 17, 1940

2,225,600

UNITED STATES PATENT OFFICE 2,225,600

APPARATUS FOR SLICING BREAD

Arthur A. Kottmann, Davenport, Iowa, assignor to Micro-Westco, Inc., Bettendorf, Iowa, a corporation of Delaware Application May 9, 1939, Serial No. 272,621

7 Claims. (Cl. 146—88)

This invention relates to an apparatus for slicing bread, and more particularly to machines of this character having an endless cutting band or bands carried on spaced rotatable members.

Bread slicing machines of many types embodying various methods of operation have been devised and operated. One reason for great diversity in the design of bread slicing machines is the peculiarity of the loaf or article being sliced. Baked loaves are of such variable character that the machine designer must produce a slicer which is of extreme flexibility so as to be readily adapted to different slicing conditions. Considerable interest has been directed toward bread slicing machines operating on the endless cutter band principle. Machines using such cutters exhibit generally improved operating characteristics and are relatively smooth running and quiet in operation. One object of the present invention is, therefore, to provide improvements generally in the construction and mode of operation of endless band type bread slicing machines so as to make the same more perfect and efficient in operation.

Another object is to provide a slicing machine in which the manner of presentment of a bread loaf to the cutters is improved so as to effect an even, uniform slicing thereof, free from waves or other irregularities.

Another object is to provide a slicing machine in which the frictional effect on a bread loaf resulting from the drawing of the cutters therethrough, is utilized in feeding the loaf through the cutters.

A further object is to provide such improvements in the construction and mode of operation of slicing machines as will simplify the design thereof and effect economy in manufacture.

Other objects and advantages will become apparent from the following detailed description of the invention which is made in connection with the accompanying drawings, in which:

Fig. 5 is a diagrammatic sectional detail illustrating a modification of the invention and showing an initial position of a loaf being fed into the cutters;

Figure 1:
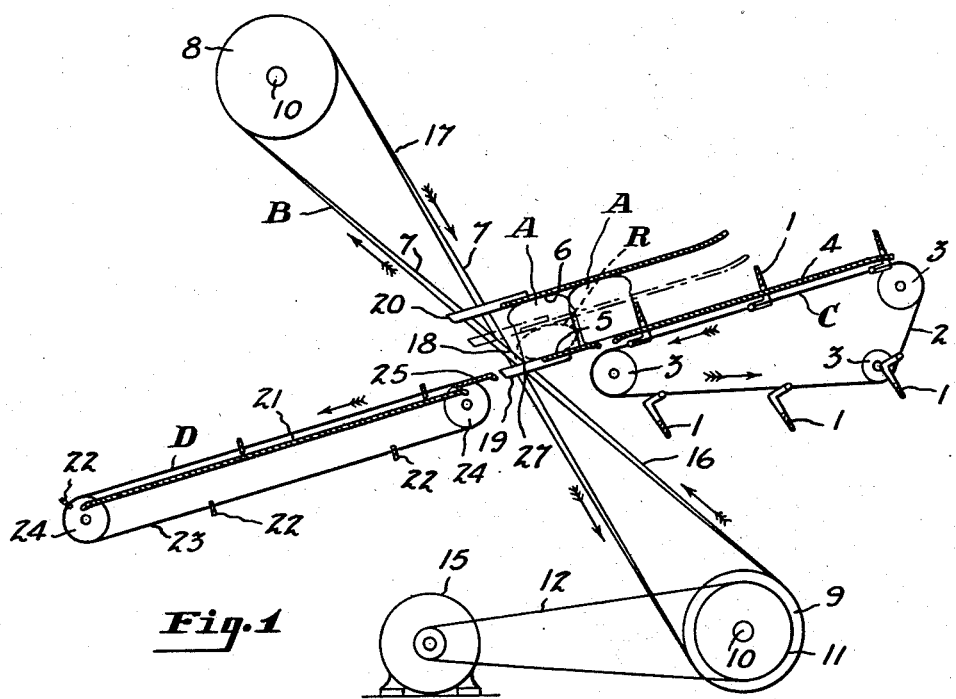
Figure 1 is a diagrammatic side elevational view showing parts of an endless band type bread slicing machine which incorporates the present invention.

Figs. 6, 7, and 8 are diagrammatic sectional details of the embodiment illustrated in Fig. 5 showing the loaf at subsequent stages of its movement through the cutters;

Fig. 9 is a diagrammatic sectional detail illustrating another modification of the invention and showing an initial position of a loaf being fed into the cutters; and Figs. 10 and 11 are diagrammatic sectional details of the embodiment illustrated in Fig. 9 showing the loaf at subsequent stages of its movement through the cutters.

The method of the present invention may be embodied in or carried out by slicing machines of various constructions, the endless band type illustrated in the drawings being preferred and utilized to illustrate in diagrammatic form the general principles involved. Referring to the drawings by letters and numerals of reference which indicate like parts throughout the several views, a suitable slicing machine incorporating the invention may comprise an infeed conveyor C which supports and advances articles or bread loaves A, which are to be sliced, into and through cutters B. The sliced articles are received by a suitable discharge conveyor D which carries the articles away from the slicing mechanism.

Preferably, although not necessary to the invention, the infeed conveyor includes a multiplicity of evenly spaced flights 1 which are pivoted at their ends to spaced, parallel endless flexible members or chains 2 trained over rotatable elements 3, one of which may be driven. The flights 1 move toward the slicing blades B over a conveyor apron 4, which supports the articles A and may be inclined downwardly as shown, and the flights engage the rear sides of the articles A to advance the same toward the slicing mechanism. At one end of the apron 4 is an article supporting table or element 5 which is aligned with the apron 4 to receive the articles A and support the same during the slicing operation. Above the apron 4 and supporting element or table 5 and in spaced parallel relation thereto is an article hold-down or guide member 6 which may engage the tops of the articles A as the latter are advanced into and through the cutters B.

These cutters may be in the form of relatively thin endless flexible bands of suitable strong resilient materials, such as spring steel. A multiplicity of scallops or serrations are ground or otherwise formed along one edge of each of the bands B to provide a cutting edge 7. The bands are trained around spaced parallel rotatable members 8 and 9 which may be in the form of cylindrical drums. These drums are mounted on shafts 10 carried by the side frames, not shown, and as many of the bands may be trained around the drums as desired, it being understood that all of the bands are of approximately the same length and are carried by the drums in the same manner, so that a description of one of the bands is equally applicable to the others.

If desired, the side frames which support the drum shafts 10 may also support the shafts for the rotatable elements 3 of the infeed conveyor, as well as the apron 4 and other parts of the slicing machine, according to conventional practice. The bottom drum 9 is provided with a pulley 11 over which is trained a belt 12 driven by a motor 15. In this manner all of the blades B are actuated through frictional engagement with the bottom drum 9. Between the drums 8 and 9 the blades B are given a half twist so that upwardly moving runs 16 thereof cross downwardly moving runs 17 at a line of intersection 18 which is between the planes of the article support 5 and article guide 6. The upwardly moving or first mentioned group or set of runs 16 of all of the bands B are thus disposed with their cutting edges 7 in approximately a common cutting plane which intersects a like common cutting plane of the cutting edges 7 of the downwardly moving second mentioned group or set of runs 17 along the line of intersection 18. The twisting of the bands B between drums 8 and 9 effects a twisting of the individual runs thereof so that the relatively thin and flat blades are disposed flatwise relative to one another adjacent the line of intersection 18 and with their cutting edges 7 directed toward the oncoming articles A.

The runs 16 and 17 are supported and guided at their ends by the rotatable members or drums 8 and 9 and adjacent the path of the articles they are guided by members 19 and 20. These guide members or combs have equally spaced slots which receive the runs of the bands to evenly space and guide the runs into substantially equidistant and parallel cutting planes. The guide members 19 and 20 may be separately carried by suitable structure extending between the side frames of the machine and may be adjustable so as to vary the spaces between the individual runs of the cutters, or the upper guide 20 may be secured to the bread guide 6 while the bottom blade guide 19 may be secured to the support element 5, as shown. Preferably, the blade guides 19 and 20 are disposed as continuations of the bread support and guides 5 and 6, respectively. Accordingly, the bottom comb or guide 19 operates with the element 5 to support and guide the loaves or articles A as the latter move through the cutters B. Similarly, the upper guide or comb 20 is disposed as a continuation of the bread guide 6 to engage the tops of articles and guide the same during the slicing operation.

Sliced articles, after being released by the cutter bands B, are received by the discharge conveyor D, which may comprise an apron 21 over which move spaced flights 22 carried by spaced parallel endless flexible members or chains 23 trained over end rotatable elements 24, the latter being carried on shafts supported in the side frames of the machine. If desired, a cross member 25 may be provided to support the articles as the latter move from between the blade guides 19 and 20 onto the discharge apron 21. This support element 25 may be arranged to provide an article supporting surface substantially continuous with the supporting surface provided by the element 5 and bottom comb 19.

The article supporting element 5 and its guide comb 19 are arranged so that their article supporting surfaces are disposed at an obtuse angle to the planes of the cutting edges of both sets of band runs, as the latter are guided by the rotatable members 8 and 9 and the slots in the guide members 19 and 20.

Figures 2, 3:
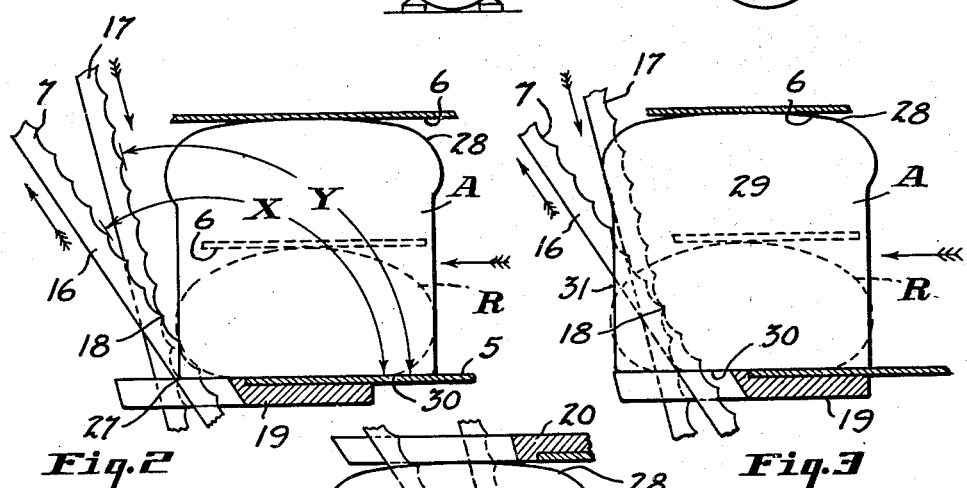
Fig. 2 is a diagrammatic detail, partly in section, showing the position of a bread loaf being advanced into the cutting mechanism of the apparatus illustrated in Fig. 1 and enlarged with respect thereto. One set or group of the cutters is shown as having already entered a corner of the loaf, while the other set or group of the cutters is about to enter the same corner.
Figs. 3 and 4 are diagrammatic sectional details similar to Fig. 2 showing subsequent stages of the feeding of a loaf into and through the cutters.

As appears clearly in Fig. 2, obtuse angle X which the cutting edges of the upwardly moving runs 16 make with the loaf supporting element 5 on the side of the runs from which the loaves approach the cutters, is materially greater than angle Y which the cutting edge of the downwardly moving runs 17 make with the article supporting surface of the element 5 on the same side of the cutters. While the exact angle made by the runs 16 and 17 with the support 5 is not critical, it has been found preferable that the angle X on the approach side of the cutters be from about 110° to about 140°, preferably in the neighborhood of about 125°, as shown; while the angle Y should be from about 95° to about 115°, preferably in the neighborhood of about 105°, as shown. In each instance it is to be understood, of course, that the obtuse angle X is to be greater than the obtuse angle Y.

As previously mentioned, the planes of the cutting edge 16 and 17 intersect in the path of the articles A between the planes of the article support element 5 and article guide 6. The arrangement of the parts in the embodiment illustrated in Figs. 1 through 4 is such that the line of intersection 18 is spaced from the plane of the support member 5 about one-fourth of the normal distance from the support element 5 to the article guide 6. In this manner the line of intersection 18 passes through the loaves A during the slicing operation about midway between the center of the loaf and the bottom thereof.

Bread is generally baked in pans so that the loaves are approximately rectangular in cross section, or at least have well defined angles at their bottom edge corners as illustrated in the drawings. Accordingly, as an article or loaf is advanced into the cutters between the support element 5 and guide member 6 in an upright position, lower forward edge 27 is the portion of the loaf which is initially engaged by the cutter bands B. As shown in Fig. 1, initial engagement occurs between the lower leading edge of the loaf and the upwardly moving runs 16, all of which engage the loaf substantially simultaneously. Because of the obtuse angle at which the runs 16 are disposed with respect to the support 5, the frictional force or effect exerted on the loaf by the runs 16 of the bands has one component in the direction of movement of the loaf which tends to draw the loaf into the cutters. Furthermore, since the initial engagement between the cutters and the loaf occurs along the lower leading edge of the loaf, which is straight and of uniform texture and also somewhat softer than upper crust 28 of the loaf because of having been formed and baked internally of the baking tin or pan, the cutters enter the loaf with a minimum of deflection and closely adjacent the guide member 19, so that the cutters are stabilized and improved slicing free from weaving and other irregularities results.

Since the line of intersection 18 between the runs 16 and 17 is normally relatively close to the support element 5, the lower leading edge 27 of the loaf is engaged by the cutting edges of the downwardly moving band runs 17 shortly after the upwardly moving runs 16 have entered the loaf, see Fig. 2. The frictional effect or force exerted on the loaf A by the downwardly moving runs 17, because of the obtuse angle Y which the runs make with the plane of the support 5, has one component which resists the movement of the loaf into the cutters. However, since the obtuse angle X of the upwardly moving runs is greater than the obtuse angle Y of the downwardly moving runs, the frictional force exerted on the loaf by the upwardly moving runs, and tending to draw the loaf into the cutters, is greater than the frictional force exerted on the loaf by the downwardly moving runs 17, which tends to resist forward movement of the loaves. Accordingly, the force tending to advance the articles into the cutters is sufficient to overcome the retarding force of the runs 17 so that the net result of the two forces is a force which tends to feed the loaves into and through the cutters.

It has previously been known that endless band cutters might be disposed so as to draw the articles to be sliced thereby into and through the cutters. However, where both runs of bands are disposed so that their frictional effect on the articles is cumulative in the direction of movement of the articles, the feeding action is apt to be too severe, so that the slices produced may not be as uniform and even as desired. Thus, the present invention provides an improved method of slicing wherein the frictional effect of one set or group of runs, which tends to draw the article into and through the cutters, is opposed by the frictional effect of another group or set of cutters, which tends to resist the movement of the articles therethrough.

In passing through the loaves A, the runs 16 and 17 of the bands are frictionally engaged by the crust or crusts of each loaf and also the central or crumb portion 29, which is relatively soft and spongy. The frictional effect or force exerted on the loaf being sliced by each run of the bands is believed to be primarily due to the engagement of the cutters with the crusts of the loaf rather than the spongy crumb portion 29. Accordingly, as the loaf A continues to move into the cutters in the direction indicated by the arrows of Figs. 2 through 4, the relationship between the force exerted on the loaf by the upwardly moving runs 16 and the downwardly moving runs 17 is believed to be maintained substantially uniform. For example, as shown in Fig. 3, the frictional effect on the loaf due to the upwardly moving runs 16 results primarily from the engagement of the runs with bottom crust 30 and front side crust 31, while the frictional force exerted on the loaf by the downwardly moving runs 17 results primarily from frictional engagement of such runs with the upper crust 28 and the bottom crust 30. Hence, even though a greater length of the downwardly moving runs 17 may be within the article, yet the relationship between the respective frictional effects may remain the same as prevail during the movement of the article or loaf from the position shown in Fig. 2 to the position shown in Fig. 3. Similarly, when the article is in the position shown in Fig. 4, the frictional effect or force exerted on the loaf A by each set or group of runs is due largely to the engagement of the individual cutters of both sets or groups of runs with the top crust 28 and the bottom crust 30. Hence, it is apparent that the present invention provides a method of slicing and the apparatus therefor in which the frictional effect of the cutters on the articles or loaves being sliced is utilized to feed the articles and also to control the movement of the articles through the cutters. The arrangement is such that the frictional effect of the cutters on the articles or loaves is maintained of a uniform character throughout the slicing of a major portion of each loaf, and the feed control contemplated is maintained substantially constant while most of the slicing of each loaf occurs.

Figure 4:
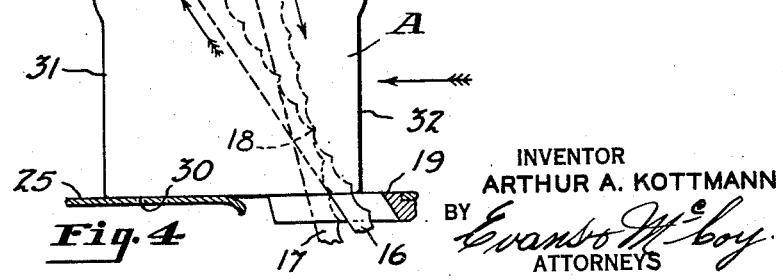

In Figs. 5 through 8 is illustrated a modification of the invention in which the positions of the parts have been arranged so that the line of intersection 18 of the cutter bands B passes through approximately the center of the articles A about midway between the article support element 5 and the article guide 6. In this embodiment of the invention initial contact between the upwardly moving runs 16 and the article A occurs along the lower leading edge 27 of the article substantially in the plane of the article support element 5. Fig. 5 shows this position of the article A relative to the cutters, and corresponds to the position of the article or loaf illustrated in Fig. 1 of the first embodiment described. Fig. 6, which corresponds to Fig. 2 of the first embodiment, shows the position of the article when the lower leading edge 27 thereof is first engaged by the downwardly moving run 17 of the cutters. It is apparent from a comparison of Figs. 2 and 6 that in the latter the upwardly moving runs 16 have cut into the article to a greater depth than in the first embodiment. This results from the relative raising of the line of intersection 18 of the planes of the cutter runs with respect to the support element 5. In this embodiment it is to be noted that the cutting edges of upwardly moving runs 16 above the line of intersection 18 follow the cutting edges of the downwardly moving runs 17 through the upper crusts 28 more closely than in the embodiment first described. See Fig. 7 which corresponds to Fig. 3 of the first embodiment and shows the downwardly moving runs 17 entering the top crust 28 with the upwardly moving runs 16 only a short distance behind, while in the embodiment of Fig. 3 the upwardly moving runs are at approximately the middle of the crust 31 of the leading side of the loaf. However, as shown in Fig. 8, in the embodiment where the line of intersection 18 passes through the center of the loaf they cut crust 32 of the rear side of the loaf after a lesser proportion of the loaf has been sliced than when the line of intersection passes closer to the bottom of the loaf in accordance with the first described embodiment of the invention (Fig. 4).

One advantageous use of the embodiment illustrated in Figs. 5 through 8 is in connection with the slicing of loaves of bread having curved sides so that their section is somewhat circular or oval as shown by broken lines A' of these figures. Since loaves of this circular or oval section have a relatively narrow base, they have a greater tendency to rock or roll about their longitudinal axes during the slicing operation than the broad based rectangular loaves A previously considered. Therefore, when the line of intersection 18 of the cutter bands 16 and 17 is approximately midway between the supporting element 5 and guide 6 the initial engagement between the cutters and the article A' occurs relatively close to the line of intersection 18 so that the tendency of one set or group of blade runs to roll the loaf, through frictional engagement therewith, is substantially eliminated or counterbalanced by the tendency of the other set or group of cutter runs to roll the loaf in the reverse direction.

In connection with the slicing of loaves having a relatively small circular or oval section, it is to be observed that the embodiment illustrated in Figs. 1 through 4 is a practical application of the invention to a commercial machine. As is well known, loaves of rye bread are usually baked in an oval section and also are customarily of less height than the average size of white or whole wheat bread. Such a loaf of rye bread is indicated in Figs. 1 and 2 by the broken lines R. The article guide 6 may be mounted by means of suitable mechanism well known in the art, so that it may be adjusted toward and away from the article support 5 and conveyor apron 4 so as to accommodate articles of different height. Accordingly, when the article guide 6 is moved toward the support 5 so as to adjust the slicing machine for the rye loaves R, the effect of such adjustment is to position the line of intersection 18 substantially midway between the planes of the support 5 and the article guide 6. Thus the line of intersection 18 is disposed to pass through approximately the center of the low rye loaf R during the slicing of the latter, and the slicing operation which results corresponds to that described in connection with the slicing of the circular or oval sectioned article A' shown in Figs. 5 through 8. It is thus apparent that the embodiment of the invention shown in Figs. 1 through 4 is of considerable commercial importance in that it inherently incorporates the desirable characteristics as to slicing and mode of operation for rectangular shaped loaves which are normally relatively tall while also exhibiting similar characteristics for oval or circular sectioned articles which are normally relatively low or short.

Figs. 9 through 11 illustrate a further embodiment of the invention in which the line of intersection 18 between the plane of the cutting edges of the upwardly moving runs 16 and the plane of the cutting edges of the downwardly moving runs 17 is disposed substantially in the plane of the article supporting element 5. Hence, as shown in Fig. 9, the baked article such as the loaf A has substantially simultaneous engagement along its lower leading edge 27 with both the upwardly and downwardly moving runs of the cutter bands B. Accordingly, this embodiment of the invention is contemplated for use in applications where it is of paramount importance that the tendency of the article to be raised off the support element 5 at initial engagement be minimized.

After initial engagement of the cutter bands with the article, the incision or cut in the article made by the downwardly moving runs 17 progresses rapidly up the front crust 31 of the article, while the advance of the cutting edge 7 of the upwardly moving runs 16 up the front crust 31 is at a relatively slower rate. For example, as shown in Fig. 10, while the downwardly moving runs 17 have entered the top crust 28 of the article, the upwardly moving runs 16 have only moved about half way up the crust. This action of the cutter bands is effective to keep the article pressed against the bottom article support 5 and is useful in slicing an article which it is desired should be subjected to minimum displacement at the moment of initial engagement between the cutter runs and the lower leading edge of the article.

The present invention thus provides a method and apparatus for slicing baked goods, such as loaves of bread, in which groups of relatively thin cutters are arranged to frictionally engage the article during slicing and control the movement of the article through the cutting mechanism. One group of the thin cutters is arranged to feed the articles through the cutters through frictional engagement with the article, while another group of cutters is arranged to resist the movement of the article through the cutters by frictional engagement therewith. That is to say, the second named group of cutters has frictional engagement with an article being sliced which is non-feeding in character.

Other features of the endless band bread slicing machine not claimed herein form the subject matter of the copending application of Arthur A. Kottmann and Earl C. Vollmer, Serial No. 260,046, filed March 6, 1939.

The principles of the present invention may be utilized in numerous constructions, change being made with regard to the particular details shown as required, many modifications and alterations being contemplated, the particular embodiments shown being given for purposes of explanation and illustration.

What I claim is:

1. In a slicing machine, a series of endless blades having parallel, laterally spaced, cutting portions, certain of said cutting portions of the blades having their cutting edges disposed in a first plane, the remainder of said cutting portions having their cutting edges disposed in a second plane which intersects the first plane, the cutting portions in one plane being interposed between the cutting portions in the other plane, an article support upon which articles are moved to and through the cutters in the region of intersection of said planes, said article support being parallel to and below the line of intersection of said planes, means for continuously driving the cutter portions in one plane downwardly relative to said article support and the cutter portions in the other plane upwardly, the angle between said support and the downwardly moving cutters being obtuse when measured above the support and from the side of article approach, and the angle between said support and the upwardly moving cutters being greater than the first mentioned angle.

2. In a bread slicing machine, a plurality of endless band blades mounted upon pulleys in crossed form, means for driving the pulleys, the downwardly moving runs of the blades being substantially in one plane, and the upwardly moving runs of the blades being in another plane which intersects the first plane in a line substantially parallel to the pulleys, a feed table disposed parallel to and at such a distance below said line of intersection that said intersection will pass through the lower portions of bread loaves fed to said cutters, the downwardly moving runs of the blades being disposed at an obtuse angle to the plane of feed, and the upwardly moving runs being disposed at a greater angle, both of said angles being measured above said support and from the side of loaf feed.

3. In a slicing machine, a plurality of endless cutter blades supported and guided so that portions of the cutters cross each other, the cutter portions being disposed in laterally spaced and parallel slicing planes, and having their cutting edges alined in two transverse intersecting planes, an article support perpendicular to said slicing planes for supporting an article for movement to and through the cutters, means for driving the cutters in one of the transverse planes upwardly and the cutters in the other transverse plane downwardly relative to said article support, the angle included between the article support and the downwardly moving cutters being obtuse when measured above the support and from the side of article approach, the angle included between the article support and the upwardly moving cutters being greater than the first mentioned angle, and the line of intersection of the transverse planes being above said article support.

4. In a slicing machine, upper and lower pulleys mounted for rotation on parallel axes, a plurality of endless band cutters trained around said pulleys in side-by-side relation, and in crossed formation, so that the portions of the cutters midway between the pulleys have their cutting edges in two planes which intersect in a line parallel to the pulley axes, means for driving said pulleys so that the cutting edges in one plane move upwardly while the cutting edges in the other plane move downwardly, an article support parallel to and below the line of intersection for supporting an article for movement to and through the cutters, an article holddown parallel to and spaced from said article support, the angle included between the article support and the plane of the downwardly moving cutters being obtuse when measured above the support and from the side of the article approach, the angle included between the support and the plane of the upwardly moving blades being greater than the first mentioned angle, and the line of intersection of the two cutter planes being above the article support and in the lower half of the space between the support and holddown.

5. In a bread slicing machine, a plurality of endless band blades mounted upon pulleys in side-by-side relation, and having runs of the blades in crossed formation, means for driving the pulleys, the downwardly moving runs of the blades being substantially in one plane and the upwardly moving runs of the blades being substantially in another plane which intersects the first plane in a line substantially parallel to the pulleys, a feed table disposed below and substantially parallel to the line of intersection of the blades for supporting an article for movement to and through the blades, the downwardly moving runs of the blades being disposed at an obtuse angle to the feed table when measured from the side of loaf feed, and the upwardly moving runs being disposed at a greater obtuse angle, whereby the resulting frictional forces, between the upwardly and downwardly moving runs of blades and the loaf being sliced, tend to hold the loaf on the feed table and advance it thereover.

6. In a band blade slicing machine, spaced pulleys, a plurality of endless ribbon-like band cutter blades trained over the pulleys in figure-8 form and in side-by-side relation, so that the cutting edges of one bank of blades cross the cutting edges of the other bank of blades intermediate the pulleys, an article support below the intersection of the two banks of cutters, means for driving the pulleys so that one bank of cutters moves upwardly relative to the article support and the other bank of cutters moves downwardly, the angle between the support and the upwardly moving cutters when measured above the support and from the side of article approach being obtuse, whereby the frictional forces of the upwardly moving cutters on the article being sliced have a forward feeding component, the angle between the support and the downwardly moving cutters being such that the frictional forces on the article being sliced have no forward feeding component and tend to hold the article on the support.

7. In a slicing machine, a series of endless blades having their cutting portions disposed in parallel, laterally spaced, slicing planes, certain of said cutting portions having their cutting edges disposed in a first cutter plane, the remainder of said cutting portions having their cutting edges disposed in a second cutter plane which intersects the first plane, the cutting edges in one plane being interposed with the cutting edges in the other plane, an article support upon which articles are moved to and through the cutting portions of said blades, said article support being substantially perpendicular to said slicing planes, the line of intersection of said cutter planes being below substantially the mid portion of the article being sliced and not below said support, means for continuously driving the cutter portions in one plane downwardly relative to said article support and the cutter portions in the other plane upwardly, the angle between said support and the upwardly moving cutters when measured above the support and from the side of article approach being obtuse, whereby the frictional forces of the upwardly moving cutters on the article being sliced have a forward feeding component, the angle between the support and the downwardly moving cutters being such that the frictional forces on the article being sliced have no forward feeding component and tend to hold the article on the support.

ARTHUR A. KOTTMANN.